P. T. MADISON.
Rail-Joint.

No. 206,741.  Patented Aug. 6, 1878.

WITNESSES.
Wm E. Moore.
J. C. Rollins.

INVENTOR.
Pulaski T. Madison,
PER
C. Bradford,
ATTORNEY.

UNITED STATES PATENT OFFICE.

PULASKI T. MADISON, OF INDIANAPOLIS, INDIANA, ASSIGNOR OF ONE-HALF HIS RIGHT TO GEORGE W. TYER, OF SAME PLACE.

IMPROVEMENT IN RAIL-JOINTS.

Specification forming part of Letters Patent No. 206,741, dated August 6, 1878; application filed April 29, 1878.

*To all whom it may concern:*

Figure 1:
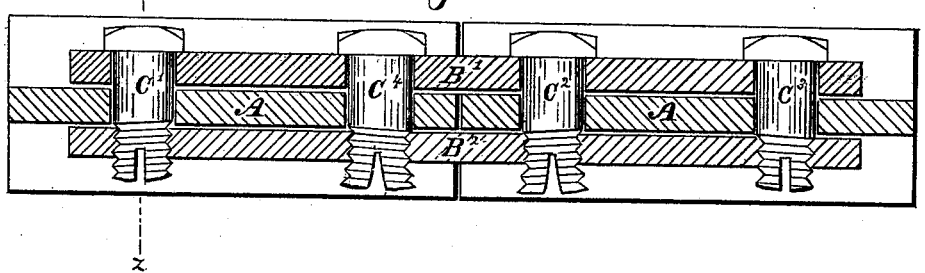
Figure 2:
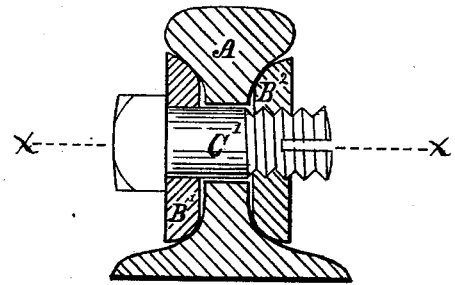

Be it known that I, PULASKI T. MADISON, of the city of Indianapolis, county of Marion, and State of Indiana, have invented certain new and useful Improvements in Railroad-Rail Joints, of which the following is a specification:

Reference being had to the accompanying drawings, which are made a part hereof, and on which similar letters of reference indicate similar parts, Figure 1 is a horizontal section of my improved joint, taken on the dotted line $x\ x$ of Fig. 2. Fig. 2 is a transverse vertical section on the dotted line $z\ z$.

These views are sectional as to the rail and splice-bars only, the bolts being shown in full.

In said drawings, those portions marked A are pieces of ordinary railroad-rail, those marked B are splice-bars, of any convenient form, and those marked C are the bolts.

Of the two splice-bars, $B^1$ is the same as the ordinary fish-plate, or of any other convenient construction, and $B^2$ is like $B^1$, except that the holes are provided with a screw-thread corresponding to that on the bolts. Of the four bolts shown in the drawing, each one is slightly different from the others, though all are of the same general construction, each having a slot cut in the threaded end. The one marked $C^1$ is shown as having the ordinary right-hand thread cut thereon, with the halves of the end left straight or in their natural position. $C^2$ is the same as $C^1$, except that the halves are spread apart. $C^3$ is the same as $C^1$, except that it has a left instead of a right hand thread, and $C^4$ is the same as $C^2$, with the same exception. The slots in these bolts are preferably made by cutting therefrom a portion of the metal, thus leaving an open space, so that they may be closed together, after being used, without having their usefulness destroyed, or that of the nut or plate into which they are screwed, as is the case when the bolts are simply split without removing any of their substance.

My invention consists in taking a sufficient number of bolts, having their alternate right and left hand threaded ends halved, and passing them through holes in the outside splice-bars and in the stems of the rails, and screwing them into holes having alternate right and left hand screw-threads cut therein in the inside splice-bars, and then spreading the halved ends of the bolts, as shown in the drawing of the bolts $C^2$ and $C^4$.

The spreading of the ends of the bolts in this manner prevents them from turning in their holes, thus accomplishing the same result that is attained with ordinary railroad-bolts by making an oblong enlargement of that portion immediately next the head. No nut-lock is needed, as the plate, which serves as a nut in this joint, is held secure by its own construction.

As will be readily seen, this makes a very secure joint, and one not likely to shake loose by any amount of jarring by the trains which may pass over it. In order to prevent any possibility of this latter result, I make one half the bolts in each joint with a right-hand thread and the other half with a left-hand thread, as by so doing any jar likely to loosen the one would also be likely to tighten the other, and thus counteract its own result.

In using this joint, all the old rails and splice-bars can be used, the only new things necessary to provide being the bolts and an equal number of splice-bars having the screw-threaded holes to those already on hand.

There is a considerable saving in material in using my improved joints, as all nuts are dispensed with and the necessary extra length of the bolts on which to put them. While these bolts can be removed and reinserted many times, if desired, it will be found that the spread ends will hold them firmly enough to prevent any accidental displacement.

It will thus be seen that I provide not only a very safe and substantial joint, but one which is very economical, as the shortness of the bolts and entire absence of nuts form an element of cheapness which, it is believed, will not be found in any other equally practicable fastening for this purpose.

Having thus fully described my said invention, what I claim as new, and desire to secure by Letters Patent, is—

1. A rail-joint secured by bolts having halved ends, and provided alternately with right and left handed screw-threads, substantially as herein shown and specified.

2. In combination with the other parts of a rail-joint, the several bolts $C^1$, $C^2$, $C^3$, and $C^4$, alternately having right and left handed threads cut thereon, and all entering into a common splice-bar, $B^2$, substantially as herein shown and specified.

In witness whereof I have hereunto set my hand and seal at Indianapolis, Indiana, this 23d day of April, A. D. 1878.

PULASKI T. MADISON. [L. S.]

Witnesses:
C. BRADFORD,
WM. E. MOORE.